(12) United States Patent
Gerrard et al.

(10) Patent No.: US 9,038,656 B2
(45) Date of Patent: May 26, 2015

(54) RESTRICTION ENGAGING SYSTEM

(75) Inventors: David P. Gerrard, Magnolia, TX (US);
Yang Xu, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 625 days.

(21) Appl. No.: 13/340,939

(22) Filed: Dec. 30, 2011

(65) Prior Publication Data

US 2012/0097265 A1    Apr. 26, 2012

Related U.S. Application Data

(62) Division of application No. 12/437,412, filed on May 7, 2009, now Pat. No. 8,261,761.

(51) Int. Cl.
*F16K 29/00*    (2006.01)
*E21B 33/12*    (2006.01)
*E21B 33/134*   (2006.01)
*E21B 34/14*    (2006.01)

(52) U.S. Cl.
CPC ............ *E21B 33/1208* (2013.01); *F16K 29/00* (2013.01); *E21B 33/134* (2013.01); *E21B 34/14* (2013.01)

(58) Field of Classification Search
CPC ..... F16K 29/00; E21B 33/1208; E21B 34/14; E21B 33/134
USPC ............. 137/613, 330, 624.27; 166/374, 373, 166/334.1, 319
See application file for complete search history.

(56) References Cited

U.S. PATENT DOCUMENTS

| | | |
|---|---|---|
| 1,883,071 A | 12/1928 | Stone |
| 2,277,816 A | 3/1942 | Brown |
| 2,376,594 A | 5/1945 | Hite |
| 2,448,423 A | 8/1948 | Dodge |
| 2,562,455 A | 7/1951 | Gridley |
| 2,769,454 A | 11/1956 | Bletcher et al. |
| 2,812,717 A | 11/1957 | Brown |
| 2,822,757 A | 2/1958 | Colberly |
| 2,973,006 A | 2/1961 | Nelson |
| 3,007,527 A | 11/1961 | Nelson |
| 3,013,612 A | 12/1961 | Angel |
| 3,117,797 A | 1/1964 | Buck |
| 3,148,731 A | 9/1964 | Holden |
| 3,211,232 A | 10/1965 | Grimmer |

(Continued)

FOREIGN PATENT DOCUMENTS

| | | |
|---|---|---|
| CA | 2760107 | 11/2010 |
| CA | 2731161 C | 6/2013 |

(Continued)

OTHER PUBLICATIONS

Notification of Transmittal of The International Search Report and the Written Opinion of the International Searching Authority; PCT/US2011/041663; Korean Intellectual Property Office; Mailed Dec. 14, 2011; 8 pages.

(Continued)

*Primary Examiner* — Kevin Lee
(74) *Attorney, Agent, or Firm* — Cantor Colburn LLP

(57) ABSTRACT

A restriction engaging system includes, a restriction engager, one or more restrictions, and at least one counter configured to permit or prevent passage of a restriction engager through one of the one or more restrictions.

17 Claims, 7 Drawing Sheets

(56) References Cited

U.S. PATENT DOCUMENTS

| | | |
|---|---|---|
| 3,263,752 A | 8/1966 | Conrad |
| 3,358,771 A | 12/1967 | Berryman |
| 3,510,103 A | 5/1970 | Carsello |
| 3,517,939 A | 6/1970 | Jaehn |
| 3,566,964 A | 3/1971 | Livingston |
| 3,583,714 A | 6/1971 | Weltzer et al. |
| 3,599,998 A | 8/1971 | Kiwalle et al. |
| 3,667,505 A | 6/1972 | Radig |
| 3,669,462 A | 6/1972 | Parsons |
| 3,703,104 A | 11/1972 | Tamplen |
| 3,727,635 A | 4/1973 | Todd |
| 3,761,008 A | 9/1973 | Goulder |
| 3,797,255 A | 3/1974 | Kammerer, Jr. et al. |
| 3,901,315 A | 8/1975 | Parker et al. |
| 3,954,138 A | 5/1976 | Miffre |
| 3,997,003 A | 12/1976 | Adkins |
| 4,067,358 A | 1/1978 | Streich |
| 4,160,478 A | 7/1979 | Calhoun et al. |
| 4,176,717 A | 12/1979 | Hix |
| 4,190,239 A | 2/1980 | Schwankhart |
| 4,246,968 A | 1/1981 | Jessup et al. |
| 4,260,017 A | 4/1981 | Nelson et al. |
| 4,291,722 A | 9/1981 | Churchman |
| 4,292,988 A | 10/1981 | Montgomery |
| 4,355,685 A | 10/1982 | Beck |
| 4,390,065 A | 6/1983 | Richardson |
| 4,423,777 A | 1/1984 | Mullins et al. |
| 4,433,726 A | 2/1984 | Preston, Jr. et al. |
| 4,438,811 A | 3/1984 | Patel |
| 4,448,216 A | 5/1984 | Speegle et al. |
| 4,474,241 A | 10/1984 | Freeman |
| 4,478,279 A | 10/1984 | Puntar et al. |
| 4,513,822 A | 4/1985 | Gilbert |
| 4,537,383 A | 8/1985 | Fredd |
| 4,554,981 A | 11/1985 | Davies |
| 4,566,541 A | 1/1986 | Moussy et al. |
| 4,576,234 A | 3/1986 | Upchurch |
| 4,583,593 A | 4/1986 | Zunkel et al. |
| 4,655,290 A | 4/1987 | Smith, Jr. |
| 4,657,078 A | 4/1987 | Fraser, III et al. |
| 4,662,785 A | 5/1987 | Gibb et al. |
| 4,669,538 A | 6/1987 | Szarka |
| 4,711,326 A | 12/1987 | Baugh et al. |
| 4,714,116 A | 12/1987 | Brunner |
| 4,715,445 A | 12/1987 | Smith, Jr. |
| 4,726,425 A | 2/1988 | Smith, Jr. |
| 4,729,432 A | 3/1988 | Helms |
| 4,762,447 A | 8/1988 | Marantette |
| 4,823,882 A | 4/1989 | Stokley et al. |
| 4,826,135 A | 5/1989 | Mielke |
| 4,856,591 A | 8/1989 | Donovan et al. |
| 4,893,678 A | 1/1990 | Stokley et al. |
| 4,944,379 A | 7/1990 | Haaser |
| 4,949,788 A | 8/1990 | Szarka et al. |
| 4,979,561 A | 12/1990 | Szarka |
| 4,991,653 A | 2/1991 | Schwegman |
| 4,991,654 A | 2/1991 | Brandell et al. |
| 5,020,946 A | 6/1991 | Nann |
| 5,029,643 A | 7/1991 | Winslow et al. |
| 5,029,644 A | 7/1991 | Szarka et al. |
| 5,056,599 A | 10/1991 | Comeaux et al. |
| 5,117,913 A | 6/1992 | Themig |
| 5,207,274 A | 5/1993 | Streich et al. |
| 5,230,390 A | 7/1993 | Zastresek et al. |
| 5,244,044 A | 9/1993 | Henderson |
| 5,297,580 A | 3/1994 | Thurman |
| 5,305,837 A | 4/1994 | Johns et al. |
| 5,325,917 A | 7/1994 | Szarka |
| 5,335,727 A | 8/1994 | Cornette et al. |
| 5,343,946 A | 9/1994 | Morrill |
| 5,343,954 A | 9/1994 | Bohlen et al. |
| 5,381,862 A | 1/1995 | Szarka et al. |
| 5,394,941 A | 3/1995 | Venditto et al. |
| 5,398,947 A | 3/1995 | Cook |
| 5,425,424 A | 6/1995 | Reinhardt et al. |
| 5,529,126 A | 6/1996 | Edwards |
| 5,551,512 A | 9/1996 | Smith |
| 5,567,093 A | 10/1996 | Richmond |
| 5,609,178 A | 3/1997 | Hennig et al. |
| 5,620,050 A | 4/1997 | Barbee |
| 5,695,009 A | 12/1997 | Hipp |
| 5,704,393 A | 1/1998 | Connell et al. |
| 5,762,142 A | 6/1998 | Connell et al. |
| 5,775,421 A | 7/1998 | Duhon et al. |
| 5,775,428 A | 7/1998 | Davis et al. |
| 5,813,483 A | 9/1998 | Latham et al. |
| 5,960,881 A | 10/1999 | Allamon et al. |
| 6,050,340 A | 4/2000 | Scott |
| 6,053,250 A | 4/2000 | Echols |
| 6,056,053 A | 5/2000 | Giroux et al. |
| 6,079,496 A | 6/2000 | Hirth |
| 6,102,060 A | 8/2000 | Howlett et al. |
| 6,155,350 A | 12/2000 | Melenyzer |
| 6,173,795 B1 | 1/2001 | McGarian et al. |
| 6,220,350 B1 | 4/2001 | Brothers et al. |
| 6,227,298 B1 | 5/2001 | Patel |
| 6,253,861 B1 | 7/2001 | Carmichael et al. |
| 6,293,517 B1 | 9/2001 | Cunningham |
| 6,378,609 B1 | 4/2002 | Oneal et al. |
| 6,474,412 B2 | 11/2002 | Hamilton et al. |
| 6,530,574 B1 | 3/2003 | Bailey et al. |
| 6,547,007 B2 | 4/2003 | Szarka et al. |
| 6,571,880 B1 | 6/2003 | Butterfield, Jr. et al. |
| 6,626,244 B2 | 9/2003 | Powers |
| 6,634,428 B2 | 10/2003 | Krauss et al. |
| 6,644,412 B2 | 11/2003 | Bode et al. |
| 6,666,273 B2 | 12/2003 | Laurel |
| 6,668,933 B2 | 12/2003 | Kent |
| 6,681,860 B1 | 1/2004 | Yokley et al. |
| 6,712,145 B2 | 3/2004 | Allamon |
| 6,712,415 B1 | 3/2004 | Darbishire et al. |
| 6,763,891 B2 | 7/2004 | Humphrey et al. |
| 6,834,726 B2 | 12/2004 | Giroux et al. |
| 6,866,100 B2 | 3/2005 | Gudmestad et al. |
| 6,896,049 B2 | 5/2005 | Moyes |
| 6,907,936 B2 | 6/2005 | Fehr et al. |
| 6,948,561 B2 | 9/2005 | Myron |
| 6,983,795 B2 | 1/2006 | Zuklic et al. |
| 7,150,326 B2 | 12/2006 | Bishop et al. |
| 7,210,534 B2 | 5/2007 | Hayter et |
| 7,322,408 B2 | 1/2008 | Howlett |
| 7,322,417 B2 | 1/2008 | Rytlewski et al. |
| 7,325,617 B2 | 2/2008 | Murray |
| 7,337,847 B2 | 3/2008 | McGarian et al. |
| 7,350,578 B2 | 4/2008 | Szarka et al. |
| 7,367,399 B2 | 5/2008 | Steele et al. |
| 7,377,321 B2 | 5/2008 | Rytlewski |
| 7,387,165 B2 | 6/2008 | Lopez de Cardenas et al. |
| 7,416,029 B2 | 8/2008 | Telfer et al. |
| 7,467,664 B2 | 12/2008 | Cochran et al. |
| 7,503,390 B2 | 3/2009 | Gomez |
| 7,503,392 B2 | 3/2009 | King et al. |
| 7,520,336 B2 | 4/2009 | Mondelli et al. |
| 7,730,953 B2 | 6/2010 | Casciaro |
| 7,798,212 B2 | 9/2010 | Bolze et al. |
| 7,832,472 B2 | 11/2010 | Themig |
| 7,909,120 B2 | 3/2011 | Slack |
| 7,971,883 B2 | 7/2011 | Soroka et al. |
| 8,061,429 B2 | 11/2011 | Du et al. |
| 8,291,988 B2 * | 10/2012 | King .......................... 166/387 |
| 8,393,389 B2 | 3/2013 | Brisco et al. |
| 8,443,894 B2 | 5/2013 | Coghill et al. |
| 8,684,096 B2 | 4/2014 | Harris et al. |
| 8,727,010 B2 | 5/2014 | Turner et al. |
| 2001/0007284 A1 | 7/2001 | French et al. |
| 2002/0170717 A1 | 11/2002 | Venning et al. |
| 2004/0007365 A1 | 1/2004 | Hill et al. |
| 2004/0221984 A1 | 11/2004 | Cram |
| 2005/0061372 A1 | 3/2005 | McGrath et al. |
| 2005/0072572 A1 | 4/2005 | Churchill |
| 2005/0126638 A1 | 6/2005 | Gilbert |
| 2005/0205264 A1 | 9/2005 | Starr et al. |
| 2006/0124310 A1 | 6/2006 | Lopez de Cardenas et al. |
| 2006/0169463 A1 | 8/2006 | Howlett |

(56) References Cited

U.S. PATENT DOCUMENTS

| | | |
|---|---|---|
| 2006/0175092 A1 | 8/2006 | Mashburn |
| 2006/0213670 A1 | 9/2006 | Bishop et al. |
| 2006/0243455 A1 | 11/2006 | Telfer et al. |
| 2007/0007007 A1 | 1/2007 | Themig et al. |
| 2007/0012438 A1 | 1/2007 | Hassel-Sorensen |
| 2007/0023087 A1 | 2/2007 | Krebs et al. |
| 2007/0095538 A1 | 5/2007 | Szarka et al. |
| 2007/0272413 A1 | 11/2007 | Rytlewski et al. |
| 2007/0289749 A1 | 12/2007 | Wood et al. |
| 2008/0066924 A1 | 3/2008 | Xu |
| 2008/0093080 A1 | 4/2008 | Palmer et al. |
| 2008/0190620 A1 | 8/2008 | Posevina et al. |
| 2008/0217025 A1 | 9/2008 | Ruddock et al. |
| 2008/0308282 A1 | 12/2008 | Standridge et al. |
| 2009/0032255 A1 | 2/2009 | Surjaatmadja et al. |
| 2009/0044944 A1 | 2/2009 | Murray et al. |
| 2009/0044946 A1 | 2/2009 | Schasteen et al. |
| 2009/0044948 A1 | 2/2009 | Avant et al. |
| 2009/0044955 A1 | 2/2009 | King et al. |
| 2009/0056934 A1 | 3/2009 | Xu |
| 2009/0056952 A1 | 3/2009 | Churchill |
| 2009/0101330 A1 | 4/2009 | Johnson |
| 2009/0107680 A1 | 4/2009 | Surjaatmadja |
| 2009/0159289 A1 | 6/2009 | Avant et al. |
| 2009/0308588 A1 | 12/2009 | Howell et al. |
| 2010/0294514 A1 | 11/2010 | Crow et al. |
| 2011/0048723 A1 | 3/2011 | Edwards |
| 2011/0073330 A1 | 3/2011 | Radford |
| 2011/0108284 A1 | 5/2011 | Flores et al. |
| 2011/0174500 A1 | 7/2011 | Davies et al. |
| 2011/0180274 A1 | 7/2011 | Wang et al. |

FOREIGN PATENT DOCUMENTS

| | | |
|---|---|---|
| EP | 0427422 A2 | 5/1991 |
| GB | 2281924 | 3/1995 |
| JP | 63174808 A | 7/1988 |
| WO | 00/15943 | 3/2000 |

OTHER PUBLICATIONS

Response to Restriction Requirement dated Apr. 22, 2009 in U.S. Appl. No. 11/891,715, U.S. Patent and Trademark Office, U.S.A.
Office Action dated Apr. 9, 2009, in U.S. Appl. No. 11/891,715, U.S. Patent and Trademark Office, U.S.A.
Ross, C. M., et al., "Current Materials and Devices for Control of Fluid Loss," SPE 54323, Apr. 1999, pp. 1-16.
Hoffman, C.R., "One-Trip Sand-Control/Liner Hangar/ Big-Bore Completion System," SPE 101086, Sep. 2006, pp. 1-10.
Baker Hughes, Baker Oil Tools, Conventional Fishing Technical Unit; Pump Out Sub Product Family No. H14061, Jun. 7, 2005, 1 page.
International Search Report, Feb. 11, 2009 pp. 1-3, PCT/US2008/072732, Korean Intellectual Property Office.
International Search Report, Feb. 11, 2009, pp. 1-3, PCT/US2008/072734, Korean Intellectual Property Office.
International Search Report, Feb. 11, 2009, pp. 1-3, PCT/US2008/072735, Korean Intellectual Property Office.
Notification of Transmittal of the International Search Report and the Written Opinion of the International Searching Authority, or the Declaration, Feb. 11, 2009, pp. 1-4, PCT/US2008/072732, Korean Intellectual Property Office.
Notification of Transmittal of the International Search Report and the Written Opinion of the International Searching Authority, or the Declaration, Feb. 11, 2009, pp. 1-4, PCT/US2008/072734, Korean Intellectual Property Office.
Notification of Transmittal of the International Search Report and the Written Opinion of the International Searching Authority, or the Declaration, Feb. 11, 2009, pp. 1-4, PCT/US2008/072735, Korean Intellectual Property Office.
Written Opinion of the International Searching Authority, Feb. 11, 2009, pp. 1-3, PCT/US2008/072732, Korean Intellectual Property Office.
Written Opinion of the International Searching Authority, Feb. 11, 2009, pp. 1-4, PCT/US2008/072734, Korean Intellectual Property Office.
Written Opinion of the International Searching Authority, Feb. 11, 2009, pp. 1-4, PCT/US2008/072735, Korean Intellectual Property Office.
G.L. Rytlewski, A Study of Fracture Initiation Pressures in Cemented Cased-Hole Wells Without Perforations, May 15, 2006, pp. 1-10, SPE 100572, Society of Petroleum Engineers, U.S.A.
International Search Report; PCT/US2010/044399; International Searching Authority KIPO; Mailed Mar. 21, 2011.
International Search Report and Written Opinion of the International Searching Authority; PCT/US2010/044378; Mailed Mar. 17, 2011.
Notification of Transmittal of the International Search Report and The Written Opinion of the International Searching Authority; PCT/US2010/044856; Mailed Apr. 15, 2011.
Notification of Transmittal of the International Search Report and The Written Opinion of the International Searching Authority; PCT/US2010/044383; Mailed Apr. 15, 2011.
International Search Report; PCT/US2010/033737; Korean Intellectual Property Office; Mailed Jan. 24, 2011.
Nternational Search Report and Written Opinion; Date of Mailing Feb. 11, 2011; International Appln No. PCT/US2010/041049; International Search Report 5 Pages and Written Opinion 3 Pages.
Notification of Transmittal of the International Search Report and The Written Opinion of the International Searching Authority; PCT/US2010/054487; International Searching Authority; KIPO; Mailed Jun. 3, 2011.
Notification of Transmittal of the International Search Report and the Written Opinion of the International Searching Authority; PCT/US2010/049810; International Searching Authority KIPO; Mailed Apr. 25, 2011.
International Search Report and Written Opinion; Date of Mailing Aug. 29, 2011; International Application No. PCT/US2011/022523; International Filing Date Jan. 26, 2011; Korean Intellectual Property Office; International Search Report 5 pages; Written Opinion 3 pages.
International Search Report; Date of Mailing Jan. 24, 2011; International Appln No. PCT/US2010/034736; 3 Pages.
International Search Report; Date of Mailing Jan. 24, 2011; Internatiaonal Appln. No. PCT/US2010/034735; 3 Pages.
Boscan, J. et al., "Successful Well Testing Operations in High-Pressure/High-Temperature Encironment; Case Histories," SPE 84096, Oct. 2003, pp. 1-15.
International Search Report, Jan. 19, 2009, pp. 1-3, PCT/US2008/072470, Korean Intellectual Property Office.
Notification of Transmittal of the International Search Report and the Written Opinion of the International Searching Authority, or the Declaration, Jan. 19, 2009, pp. 1-4, PCT/US2008/072470, Korean Intellectual Property Office.
Written Opinion of the International Searching Authority, Jan. 19, 2009, pp. 1-3, PCT/US2008/072470, Korean Intellectual Property Office.
Notice of Allowance & Fees Due and Notice of Allowability dated Jan. 5, 2009, in U.S. Appl. No. 11/891,713, U.S. Patent and Trademark Office, U.S.A.
Office Action dated Jul. 16, 2008 in U.S. Appl. No. 11/891,713 U.S. Patent and Trademark Office, U.S.A.
Office Action dated Jun. 19, 2009, in U.S. Appl. No. 11/891,715, U.S. Patent and Trademark Office, U.S.A.
Office Action dated Jun. 25, 2009, in U.S. Appl. No. 11/891,714, USPTO, U.S.A.
Brad Musgrove, Multi-Layer Fracturing Solution Treat and Produce Completions, Nov. 12, 2007, pp. 1-23, Schlumberger, U.S.A.
Response to Office Action dated Oct. 15, 2008, in U.S. Appl. No. 11/891,713, U.S. Patent and Trademark Office, U.S.A.
RFID Keystone Module, RFID & Intelligent Products, Petrowell retrieved online on May 27, 2009 from: http://www.petrowell.co.uk/index2.php?option=com_docman&task=doc_view&gid=15&Itemid=26.
StageFRAC Maximize Reservoir Drainage, 2007, pp. 1-2, Schlumberger, U.S.A.
TAP Completion System, Schlumberger, 4 pages, Dec. 2007.

(56) References Cited

OTHER PUBLICATIONS

Hoch, Ottmar, Marty Stromquist et al., "Multiple Precision Hydraulic Fractures of Low Permeability Horizontal Openhole Sandstone Wells," SPE Annual Technical Conference and Exhibition, Oct. 5-8, 2003, Denver Colorado; pp. 1-2.

International Search Report for PCT Application No. PCT/US2010/034752, dated Jan. 27, 2011, pp. 1-3.

International Search Report with Written Opinion; International Applictaion No. PCT/US2011/029622; International Filing Date: Nov. 8, 2010, 9 pages.

* cited by examiner

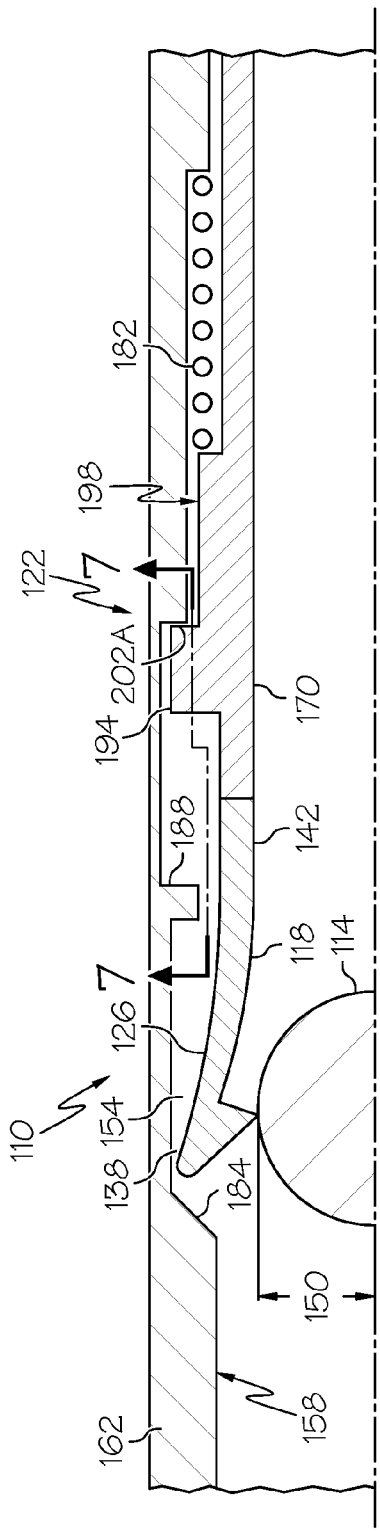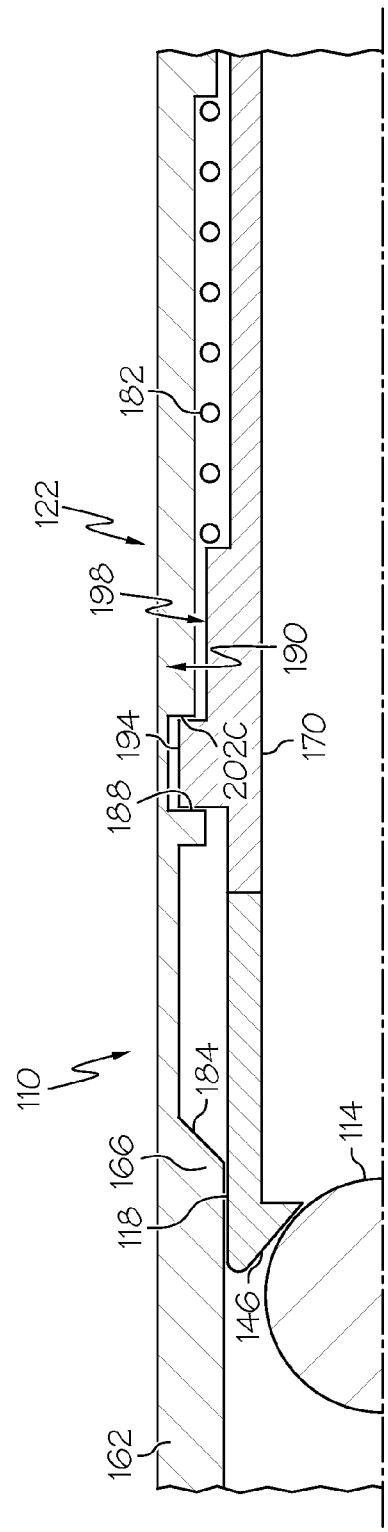

RESTRICTION ENGAGING SYSTEM

CROSS REFERENCE TO RELATED APPLICATION

This application is a divisional application of U.S. patent application Ser. No. 12/437,412, filed May 7, 2009 now U.S. Pat. No. 8,261,761, the entire contents of which are incorporated herein by reference.

BACKGROUND

In industries concerned with earth formation boreholes, such as hydrocarbon recovery and gas sequestration, for example, it is not uncommon for various operations to utilize a temporary or permanent plugging device. Sometimes plugging is desirable at a first location, and subsequently at a second location. Moreover, additional plugging locations may also be desired and the plugging can be sequential for the locations or otherwise. Systems employing droppable members, such as balls, for example, are typically used for just such purpose. The ball is dropped to a ball seat positioned at the desired location within the borehole thereby creating the desired plug.

In applications where the first location is further from surface than the second location, it is common to employ seats with sequentially smaller diameters at locations further from the surface. Dropping balls having sequentially larger diameters allows the ball seat furthest from surface to be plugged first (by a ball whose diameter is complementary to that seat), followed by the ball seat second furthest from surface (by a ball whose diameter is complementary to that seat) and so on.

The foregoing system, however, creates increasingly restrictive dimensions within the borehole that can negatively impact flow therethrough as well as limit the size of tools that can be run into the borehole. Systems and methods that allow operators to plug boreholes at multiple locations without the drawbacks mentioned would be well received in the art.

BRIEF DESCRIPTION

Disclosed herein is a restriction engaging system. The system includes, a restriction engager, one or more restrictions, and at least one counter configured to permit or prevent passage of a restriction engager through one of the one or more restrictions.

BRIEF DESCRIPTION OF THE DRAWINGS

The following descriptions should not be considered limiting in any way. With reference to the accompanying drawings, like elements are numbered alike:

FIG. 5 depicts a partial cross sectional view of an alternate embodiment of a selectively movable seat arrangement disclosed herein shown in a restriction engager passing position;

FIG. 6 depicts a partial cross sectional view of the selectively movable seat arrangement of FIG. 5 shown in a restriction engager non-passing position.

DETAILED DESCRIPTION

A detailed description of one or more embodiments of the disclosed apparatus and method are presented herein by way of exemplification and not limitation with reference to the Figures.

Embodiments of the selectively movable seat arrangement disclosed herein are positionable within a borehole tubular or open hole and maintain a seat arrangement or restriction to a member or restriction engager after having allowed a selected number of restriction engagers to pass therethrough. When the restriction is maintained, the restriction engager can sealingly engage the restriction thereby sealing the borehole tubular to flow therepast. Such a seal allows for the creation of a pressure differential in the borehole that is usable by operators for such things as actuation of tools and fracturing of formations, for example.

Figure 1:
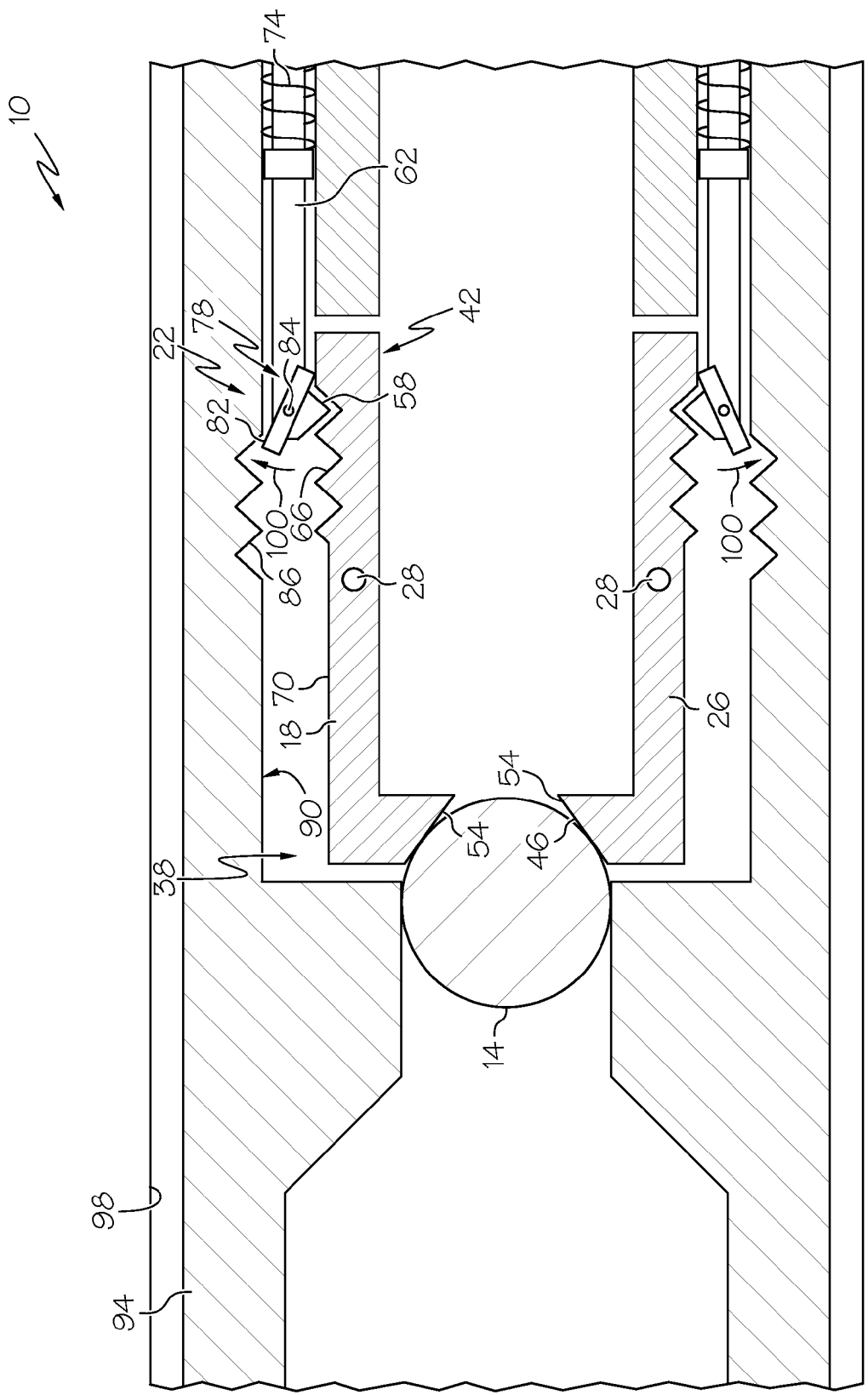
FIG. 1 depicts a cross sectional view of a selectively movable seat arrangement disclosed herein in a resting position.
Figure 2:
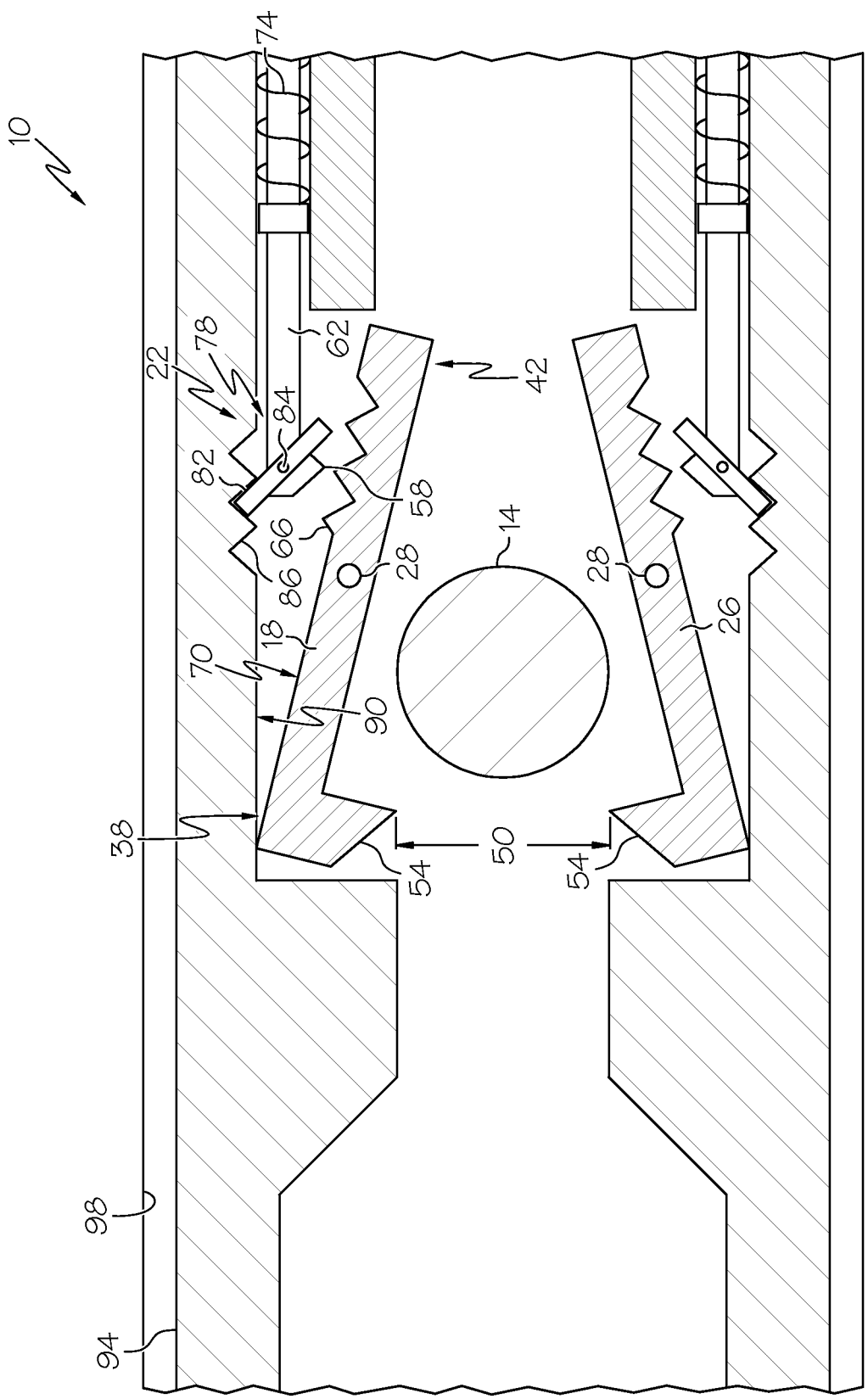
FIG. 2 depicts a cross sectional view of the selectively movable seat arrangement of FIG. 1, shown in an open position.

Referring to FIGS. 1 and 2, an embodiment of the selectively movable seat arrangement 10 disclosed herein in a resting position and an open position, respectively. The selectively movable seat arrangement also described herein as a selective landing configuration 10 includes, a member described herein as a restriction engager 14 and illustrated herein as a ball, one of one or more seat arrangements described herein as restrictions 18 and illustrated herein as a ball seat, and a counter 22. The counter 22 is configured to index each time one of the restriction engagers 14 passes through the restriction 18. The restriction 18, of this embodiment, has a plurality of pivot arms 26 that are pivotal about pivot points 28 between an impassable position also referred to herein as a first pivot arm position and a passable position also referred to herein as a second pivot arm position. Each of the pivot arms 26 has a first end 38 and a second end 42. When in the first pivot arm position (shown in FIG. 1) the first ends 38 are adjacent to one another to form a ring shaped continuous reduced dimension surface 46 with which the restriction engager 14 is engagable. It should be noted that the restriction engager 14 may sealingly engage with the reduced dimension surface 46, however, it is not required. When in the second pivot arm position (shown in FIG. 2) the first ends 38 are displaced radially outwardly defining an opening 50 sized to permit passage of the restriction engager 14 therethrough. The pivot arms 26 in one embodiment may be rotationally biased by a biasing member (not shown) such as a torsional spring, for example, that biases them toward the first pivot arm position.

Movement of the pivot arms 26 from the first pivot arm position to the second pivot arm position is accomplished by urging a restriction engager 14 therethrough with pressure, for example. Ramped surfaces 54 on the first ends 38 are configured to cause the first ends 38 to move radially outwardly in response to a restriction engager 14, such as a ball, being urged thereagainst. Movement of the pivot arms 26 to the second pivot arm position causes the second ends 42 to move radially inwardly. This radial inward movement causes a tooth 58 on each of a plurality of rams 62 to disengage teeth 66 on an outer radial surface 70 of the second ends 42 of the pivot arms 26. Once the tooth 58 of the ram 62 is disengaged the ram 62 is able to move longitudinally under a biasing load provided by a biasing member 74, disclosed herein as a compression spring.

An escapement 78, illustrated herein as a lever 82 pivotal about pivot point 84, engages with teeth 86 on an inner surface 90 of a tubular 94, such as a casing or drillstring, positioned within a wellbore 98, limits the longitudinal movement of the ram 62. The lever 82 and teeth 86 are sized and positioned to allow the ram 62 to advance only a specific dimension each time the tooth 58 disengages from the teeth 66. This dimension coincides with the spacing between the adjacent teeth 66. In so doing, the escapement 78 assures that the tooth 58 will reengage with the next tooth 66 each time the pivot arms 26 return to the first pivot arm position. The lever 82 can be rotationally biased, in a direction of arrow 100, by a biasing member (not shown) such as a torsional spring, for example, to assure that the lever 82 engages with the teeth 86.

Figure 3:
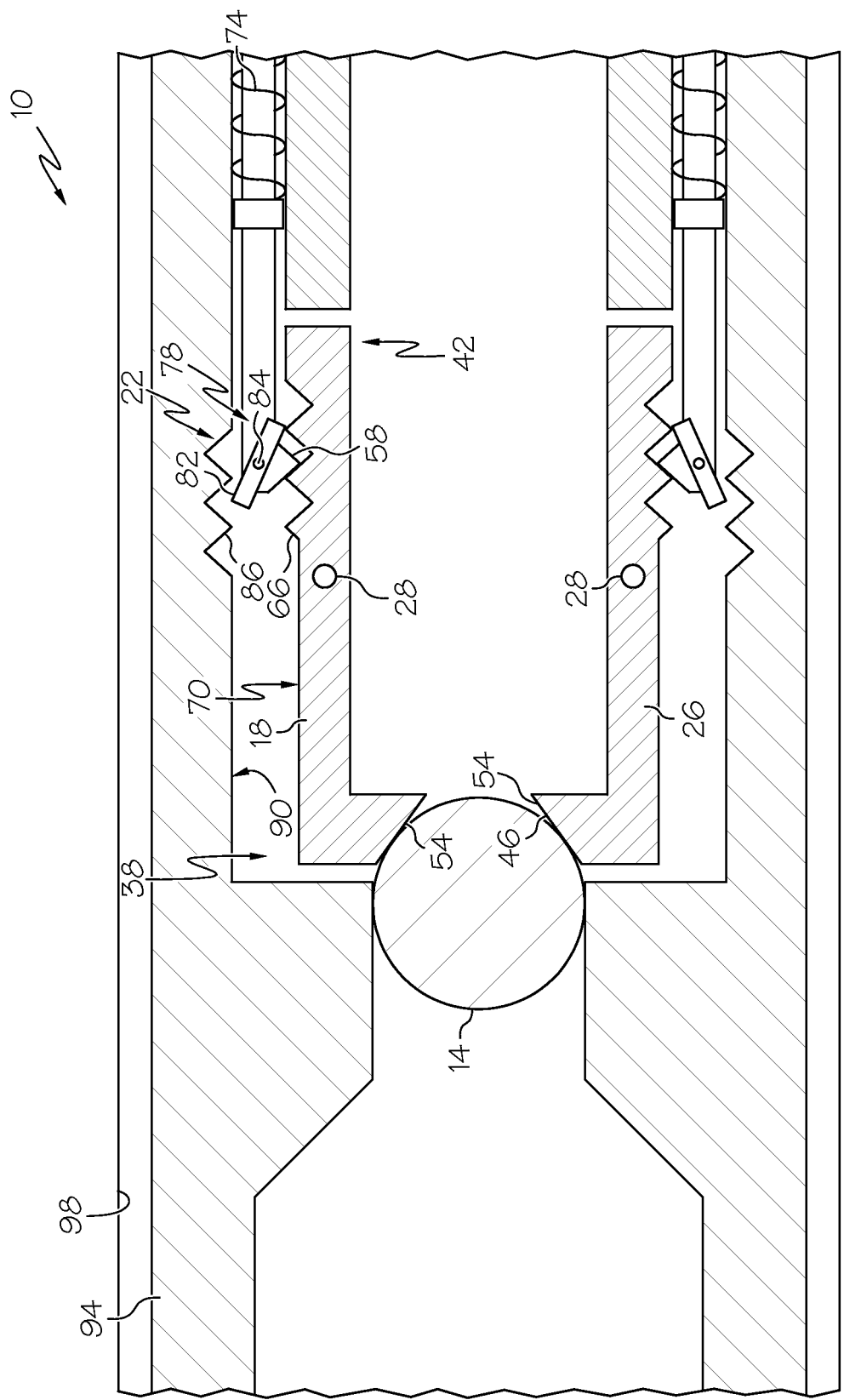
FIG. 3 depicts a cross sectional view of the selectively movable seat arrangement of FIG. 1, shown after having passed one restriction engager.

Referring to FIG. 3, the lever 82 can also be sized such that it contacts the outer radial surface 70 when the pivot arms 26 are moved back to the first pivot arm position thereby rotating the lever 82 in a direction opposite to the direction of arrow 100, disengaging the lever 82 from the teeth 86 in the process. (Note: the radial surface 70 also exists between each of the teeth 66). By doing so the lever 82 is properly positioned to engage with the next tooth 86 as soon as the pivot arms 26 begin pivoting again toward the second pivot arm position. This sequential indexing of the tooth 58 along the teeth 86 defines the counter 22.

Figure 4:
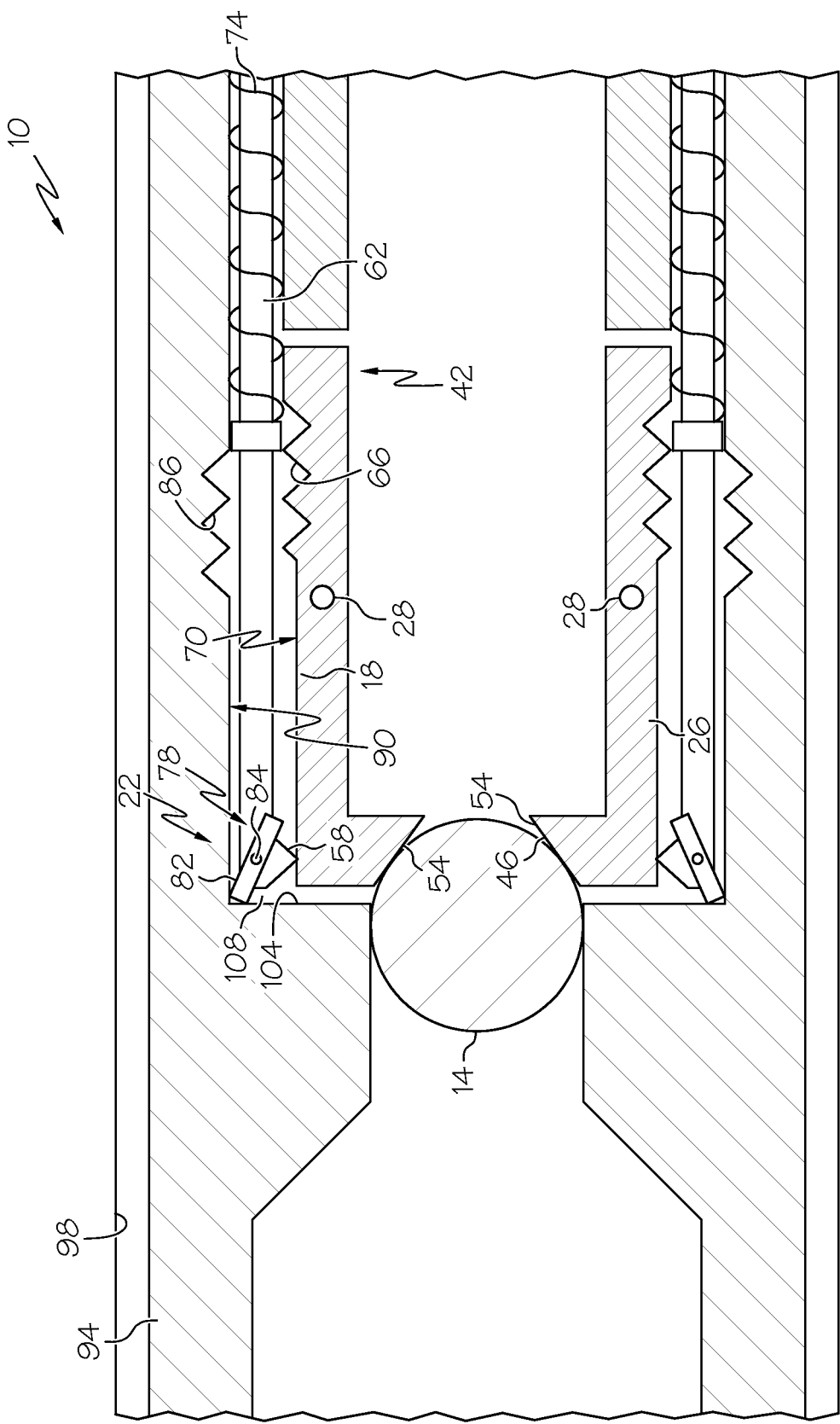
FIG. 4 depicts a cross sectional view of the selectively movable seat arrangement of FIG. 1, shown preventing passage of a restriction engager after having passed a selected number of the restriction engagers.

Referring to FIG. 4, the number of teeth 66 is selected to establish the number of restriction engagers 14 that the counter 22 will allow to pass the restriction 18. Once the lever 82 is disengaged from the last tooth 66 the lever 82 will continue to be biased against the surface 90. However, without any additional teeth 66 for the lever 82 to engage there is nothing to stop the ram 62 from moving under the urging of the biasing member 74. As such, the ram 62 will stroke until contact is made with a stop 104, shown here on the tubular 94, although other mechanical features definable of full travel of the ram 62 are contemplated.

An annular dimension of the first end 38 of the pivot arms 26 is set to essentially fill an annular gap 108 defined between the outer radial surface 70 and the inner surface 90. By filling the annular gap 108, the first end 38 prevents any additional radial outward pivoting of the pivot arms 26. This non-pivoting condition of the pivot arms 26 maintains the restriction 18 thereby preventing passage of the restriction engager 14 and providing a sealing seat for the restriction engager 14 to seal to. The foregoing structure allows an operator to selectively set how many restriction engagers 14 will pass each restriction 18 before the restriction 18 is maintained, thereby preventing additional restriction engagers 14 from passing.

Referring to FIGS. 5 and 6, an alternate embodiment of a selective landing configuration 110 is illustrated. As with the landing configuration 10 the landing configuration 110 permits a selectable number of restriction engagers 114 to pass a restriction 118 before a counter 122 maintains the restriction 118 impassable by additional restriction engagers 114. The counter 122 is configured to index each time one of the restriction engagers 114 passes through the restriction 118. The restriction 118, of this embodiment, has a plurality of deformable arms 126 that are able to elastically deform between an impassable position also referred to herein as a first deformable arm position and a passable position also referred to herein as a second deformable arm position in the fashion of a collet. Each of the deformable arms 126 has a first end 138 and a second end 142.

When in the first deformable arm position (shown in FIG. 6) the first ends 138 seal to one another to form a ring shaped continuous reduced dimension surface 146 that is sealingly engagable with the restriction engager 114. When in the second deformable arm position (shown in FIG. 5) the first ends 138 are displaced radially outwardly defining an opening 150 sized to permit passage of the restriction engager 114 therethrough. An annular recess 154 in an inner radial surface 158 of a tubular 162 within which the landing configuration 110 is positioned, receives the first ends 138 as the deformable arms 126 are deformed. A nonrecessed portion 166 of the inner radial surface 158 maintains the deformable arms 126 in a nondeformed orientation (first deformable arm position) when the first ends 138 are longitudinally aligned therewith. It is precisely this longitudinal alignment between the first ends 138 of the deformable arms 126 and the nonrecessed portion 166 that the counter 122 controls to allow or prevent the passing of the restriction engager 114.

The counter 122 includes a rotationally indexable sleeve 170 that is longitudinally movable against a biasing member 182 that longitudinally biases the sleeve 170 and the deformable arms 126 in a direction wherein the nonrecessed portion 166 radially supports the deformable arms 126. The restriction 118 and the sleeve 170 are therefore longitudinally movable in response to a restriction engager 114 contacting the deformable arms 126 and providing a longitudinal urging against them in response to pressure applied thereto. The biasing member 182 can reset the sleeve 170 and the deformable arms 126 back to the first deformable arm position after the restriction engager 114 has passed therethrough. Ramped surfaces 184 assure the deformable arms 126 return to the first deformable arm position while also preventing them from wedgably engaging within the annular recess 154.

Figure 7:
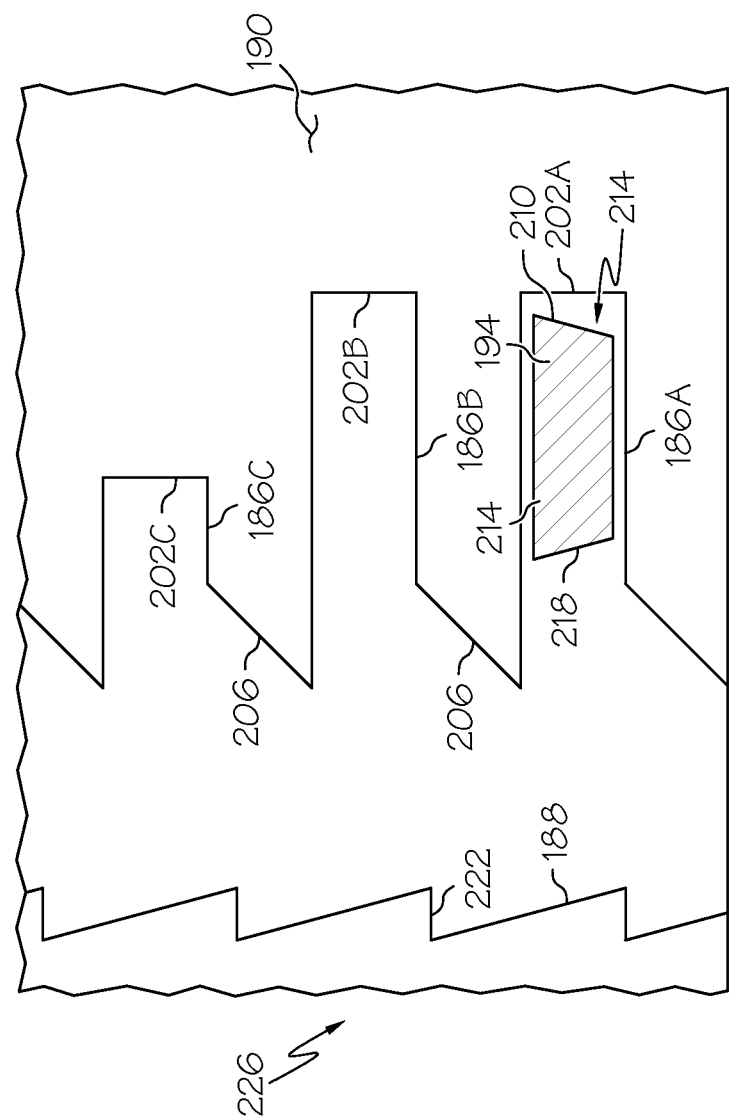
FIG. 7 depicts a partial cross sectional view of the tubular of FIG. 5 taken at arrows 7-7.
Figure 8:
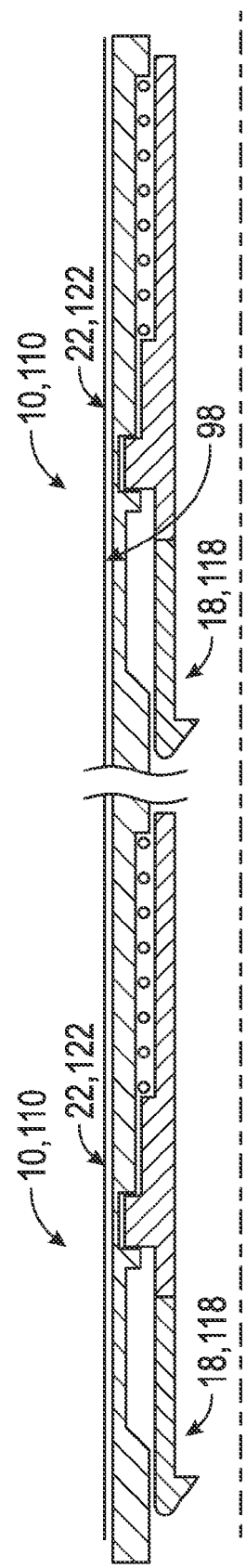
FIG. 8 depicts a partial schematic view of a plurality of selectively movable seat arrangements disclosed herein positioned within a wellbore.

Referring to FIG. 7, a plurality of slots 186, with three slots 186A-186C being shown, and a saw tooth stop surface 188 formed in an inner radial surface 190 of the tubular 162 define the extent of the longitudinal movement of the sleeve 170, the deformable arms 126 and the restriction 118. A plurality of tabs 194 radially proud of an outer radial surface 198 of the sleeve 170 slidably engages the slots 186. When the tabs 194 are bottomed against surface 202A or 202B from slot 186A or 186B, respectively, the longitudinal travel of the sleeve 170 allows the first ends 138 of the deformable arms 126 to move into longitudinal alignment with the annular recess 154. The deformable arms 126 being radially unsupported are able to deform from the first deformable arm position to the second deformable arm position, thereby permitting the restriction engager 114 passage by the restriction 118. However, once the sleeve 170 has rotationally indexed to the point that the tab 194 is engaged with the slot 186C, the bottom 202C prevents longitudinal movement of the sleeve 170 (and the deformable arms 126) such that the first ends 138 of the deformable arms 126 remain radially supported by the nonrecessed portion 166. The nonrecessed portion 166 thereby preventing deformation of the deformable arms 126 from the first deformable arm position to the second deformable arm position and passage of the restriction engager 114 therethrough.

Angled surfaces 206 between the slots 186 and angled surfaces 210 on an end 214 of the tabs 194 cause rotational indexing the sleeve 170 when the sleeve 170 is moved toward the bottoms 202. Similarly, the saw tooth stop surface 188 and the angled surface 218 on the tabs 194 cause the sleeve 170 to rotationally index in response to movement of the sleeve 170 under urging of the biasing member 182. Rotational stop surfaces 222 on the saw tooth stop surface 188, act as an escapement 226 to prevent rotation of the sleeve 170 beyond the next slot 186, thereby assure indexing of only one slot 186 per passage of one of the restriction engagers 114.

The foregoing structure provides a well operator with the means to set a restriction 118 to selectively pass a desired number of restriction engagers 114 by forming the tubular 162 with the desired number of shallow slots 186A and 186B before a deep slot 186C.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A system, comprising:
   one or more restriction engagers;
   one or more restrictions; and
   at least one counter configured to permit or prevent passage of a restriction engager through one of the one or more restrictions, the at least one counter configured to be responsively indexed each time one of the restriction engagers passes through the one of the one or more restrictions, the at least one counter preventing passage of an additional one of the restriction engagers after a selected number of the restriction engagers have passed the one of the one or more restrictions.

2. The system of claim 1, wherein the restriction engager is a ball.

3. The system of claim 1, wherein the one of the one or more restrictions include a plurality of arms that are movable between a first position that allows passage of a restrictor engager and a second position that prevent passage of a restrictor engager and the at least one counter is configured to allow movement of the plurality of arms from the first position to the second position as long as the at least one counter has indexed no more than a selected number of times but prevent movement of the plurality of arms from the first position to the second position after the at least one counter has indexed the selected number of times.

4. The system of claim 1, wherein the one or more restrictions is a plurality of restrictions and each of the plurality of restrictions has at least one counter in operable communication therewith configured to permit passage of a selected number of the restriction engagers before preventing passage of an additional one of the restriction engagers thereby.

5. The system of claim 4, wherein the selected number of restriction engagers passable by each of the plurality of restrictions is independently selectable from one another.

6. The system of claim 1, wherein fluid flow is restricted from passing by the restriction engager when the restriction engager is prevented from passing a restriction.

7. The system of claim 6, wherein the restriction to fluid flow past the restriction engager allows pressure to build thereacross.

8. The system of claim 1, wherein the one or more restrictions includes members that are allowed to move when the one or more restrictions are configured to permit passage of a restriction engager.

9. The system of claim 8, wherein the movement includes movement that is radially outwardly.

10. The system of claim 1, wherein the one or more restrictions includes members that are prevented from moving when the one or more restrictions are configured to prevent passage of a restriction engager.

11. The system of claim 1, wherein the one or more restrictions include members that are allowed to deform when the one or more restrictions are configured to permit passage of a restriction engager.

12. The system of claim 1, wherein the one or more restrictions include members that are prevented from deforming when the one or more restrictions are configured to prevent passage of a restriction engager.

13. The system of claim 1, wherein the at least one counter includes an element that moves longitudinally each time the at least one counter is indexed.

14. The system of claim 13, wherein the element is prevented from longitudinally moving after the at least one counter has indexed a selected number of times.

15. The system of claim 13, wherein the element allows at least a portion of the plurality of arms of the one of the one or more restrictions to move when the element is moved longitudinally and prevents the at least a portion of the plurality of arms from moving when the element is not moved longitudinally.

16. The system of claim 13, wherein the element advances incrementally further in a same direction each time the at least one counter is indexed.

17. The system of claim 13, wherein the element comprises a sleeve or a ram.

* * * * *